(12) United States Patent
Zaki et al.

(10) Patent No.: US 11,671,930 B2
(45) Date of Patent: Jun. 6, 2023

(54) EARLY TERMINATION OF SYNCHRONIZATION PROCEDURE

(71) Applicant: QUALCOMM Incorporated, San Diego, CA (US)

(72) Inventors: Ahmed Zaki, Bengaluru (IN);
Vijayvaradharaj Tirucherai Muralidharan, Santa Clara, CA (US);
Vinod Ramaswamy, Hyderabad (IN);
Murali Menon, Acton, MA (US);
Nayeem Mohammad, Hyderabad (IN);
Niranjana Bhatta, Bangalore (IN);
Vishu Kumar, Bengaluru (IN)

(73) Assignee: Qualcomm Incorporated, San Diego, CA (US)

( * ) Notice: Subject to any disclaimer, the term of this patent is extended or adjusted under 35 U.S.C. 154(b) by 66 days.

(21) Appl. No.: 16/876,954

(22) Filed: May 18, 2020

(65) Prior Publication Data

US 2020/0383077 A1 Dec. 3, 2020

(30) Foreign Application Priority Data

May 29, 2019 (IN) .............................. 201941021257

(51) Int. Cl.
*H04W 56/00* (2009.01)
*H04W 76/28* (2018.01)
(Continued)

(52) U.S. Cl.
CPC ....... *H04W 56/0015* (2013.01); *H04W 48/20* (2013.01); *H04W 52/0225* (2013.01); *H04W 76/28* (2018.02)

(58) Field of Classification Search
CPC . H04W 56/0015; H04W 76/28; H04W 48/20; H04W 52/0225; H04W 68/005;
(Continued)

(56) References Cited

U.S. PATENT DOCUMENTS

2008/0214174 A1\* 9/2008 Palenius ............... H04W 48/20
455/422.1
2011/0286442 A1\* 11/2011 Maurice ........... H04W 56/0015
370/350

(Continued)

FOREIGN PATENT DOCUMENTS

KR 20150128426 A 11/2015

OTHER PUBLICATIONS

International Search Report and Written Opinion—PCT/US2020/033571—ISA/EPO—dated Oct. 1, 2020.

*Primary Examiner* — Marcus Hammonds
(74) *Attorney, Agent, or Firm* — Harrity & Harrity, LLP

(57) ABSTRACT

Methods, systems, and apparatuses for wireless communication are disclosed. In one aspect, a user equipment (UE) determines to perform a synchronization procedure and receives at least one synchronization signal. The UE may generate a detection metric based at least in part on the at least one synchronization signal and compare the detection metric or detection metrics accumulated since determining to perform the synchronization procedure with a detection threshold. The detection threshold may be associated with the at least one synchronization signal utilized to determine whether the synchronization procedure can be terminated prior to receiving a predetermined number of synchronization signals. The UE may continue or terminate the synchronization procedure based at least in part on a result of the comparison.

30 Claims, 9 Drawing Sheets

(51) Int. Cl.
*H04W 48/20* (2009.01)
*H04W 52/02* (2009.01)

(58) Field of Classification Search
CPC .......... H04W 52/0245; H04W 56/0005; Y02D 30/70
See application file for complete search history.

(56) References Cited

U.S. PATENT DOCUMENTS

| | | | |
|---|---|---|---|
| 2011/0309977 A1* | 12/2011 | Daugherty, Jr. ........ | G01S 19/42 342/357.74 |
| 2013/0122822 A1* | 5/2013 | Srinivasan .............. | H04L 27/26 455/67.13 |
| 2014/0119357 A1* | 5/2014 | Abraham ............ | H04W 56/001 370/350 |
| 2016/0174176 A1* | 6/2016 | Adachi ............... | H04W 56/002 370/350 |
| 2016/0249311 A1* | 8/2016 | Yu ..................... | H04W 56/0015 |
| 2017/0064656 A1* | 3/2017 | Kim .................. | H04W 56/0005 |
| 2017/0289934 A1* | 10/2017 | Sheng .................. | H04W 56/001 |
| 2020/0092734 A1* | 3/2020 | Zhu .................. | H04W 56/0015 |
| 2020/0367163 A1* | 11/2020 | Qu ....................... | H04B 17/336 |

* cited by examiner

| SNR (dB) | Comparison | Early Termination | Power saving % |
|---|---|---|---|
| −10 | 64 | 19 | 70.0 |
| 0 | 64 | 4 | 93.7 |
| 18 | 64 | 1 | 98.4 |

FIG. 4

EARLY TERMINATION OF SYNCHRONIZATION PROCEDURE

CROSS-REFERENCE TO RELATED APPLICATION

This Patent Application claims priority to Indian Patent Application No. 201941021257, filed on May 29, 2019, entitled "EARLY TERMINATION OF SYNCHRONIZATION PROCEDURE," and assigned to the assignee hereof. The disclosure of the prior Application is considered part of and is incorporated by reference in this Patent Application.

FIELD

The present disclosure relates generally to wireless communications and to synchronization and cell identification.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communication system may include a number of base stations or access network nodes, each simultaneously supporting communication for multiple communication devices also known as user equipment (UE).

As the number and type of devices utilizing wireless networks continues to grow, there exists a need for further improvements in NR and LTE technology. Preferably, these improvements should enhance device performance without increasing costs.

SUMMARY

A method of wireless communication performed by a user equipment is disclosed. In one aspect, the method may include determining to perform a synchronization procedure and receiving at least one synchronization signal. The method may also include generating a detection metric based at least in part on the at least one synchronization signal. The method may include comparing the detection metric or detection metrics accumulated since determining to perform the synchronization procedure with a detection threshold. The detection threshold may be associated with the at least one synchronization signal for determining whether the synchronization procedure can be terminated prior to receiving a predetermined number of synchronization signals. The method may include continuing or terminating the synchronization procedure based at least in part on a result of the comparing. In one aspect, the method includes terminating the synchronization procedure prior to receiving the predetermined number of synchronization signals.

An apparatus is disclosed. The apparatus may be a user equipment (UE) or a part of a UE. In one aspect, the apparatus includes means for determining to perform a synchronization procedure and means for receiving at least one synchronization signal. The apparatus may also include means for generating a detection metric based at least in part on the at least one synchronization signal. The apparatus may include means for comparing the detection metric or detection metrics accumulated since determining to perform the synchronization procedure with a detection threshold. The detection threshold may be associated with the at least one synchronization signal for determining whether the synchronization procedure can be terminated prior to receiving a predetermined number of synchronization signals. The apparatus may include means for continuing or terminating the synchronization procedure based at least in part on a result of the comparing. In one aspect, the means for continuing or terminating the synchronization procedure are operative to terminate the synchronization procedure prior to receiving the predetermined number of synchronization signals.

Another apparatus is disclosed. The apparatus may be a UE or a part of a UE. In one aspect, the apparatus includes a processor and a memory coupled with the processor. The apparatus may include instructions stored in the memory and operable, when executed by the processor, to determine to perform a synchronization procedure and to receive at least one synchronization signal. The apparatus may include instructions operable, when executed by the processor, to generate a detection metric based at least in part on the at least one synchronization signal. The apparatus may include instructions operable, when executed by the processor, to compare the detection metric or detection metrics accumulated since determining to perform the synchronization procedure with a detection threshold. The detection threshold may be associated with the at least one synchronization signal for determining whether the synchronization procedure can be terminated prior to receiving a predetermined number of synchronization signals. The apparatus may include instructions operable, when executed by the processor, to continue or terminate the synchronization procedure based at least in part on a result of the comparison. In one aspect, the apparatus may include instructions operable, when executed by the processor, to terminate the synchronization procedure prior to receiving the predetermined number of synchronization signals.

A non-transitory computer readable medium storing code for wireless communication is disclosed. The code may comprise instructions executable by a processor of a UE to determine to perform a synchronization procedure and to receive at least one synchronization signal. The code may further comprise instructions executable by the processor to generate a detection metric based at least in part on the at least one synchronization signal. The code may further comprise instructions executable by the processor to compare the detection metric and detection metrics accumulated since determining to perform the synchronization procedure with a detection threshold. The detection threshold may be associated with the at least one synchronization signal for determining whether the synchronization procedure can be terminated prior to receiving a predetermined number of synchronization signals. The code may further comprise instructions executable by the processor to continue or terminate the synchronization procedure based at least in part on a result of the comparing. In one aspect, the code may further comprise instructions executable by the processor to terminate the synchronization procedure prior to receiving the predetermined number of synchronization signals.

In some examples of the method, apparatus, and non-transitory computer-readable medium described above, the UE may determine to perform an initial cell search or a timing synchronization procedure associated with a wakeup from a discontinuous reception (DRX). In some examples, the detection threshold may include a first detection threshold for the initial cell search, and a second detection threshold for the timing synchronization procedure. In some examples, the detection threshold comprises a first detection threshold for detecting a primary synchronization signal, and a second detection threshold for detecting a secondary synchronization signal. In some examples, the UE may schedule an additional sleep period prior to a paging occasion based at least in part on terminating the timing synchronization procedure before the predetermined number of synchronization signals are received.

BRIEF DESCRIPTION OF THE DRAWINGS

FIG. 4 illustrates aspects of a detection threshold used for early termination in accordance with the present disclosure.

DETAILED DESCRIPTION

Figure 1:
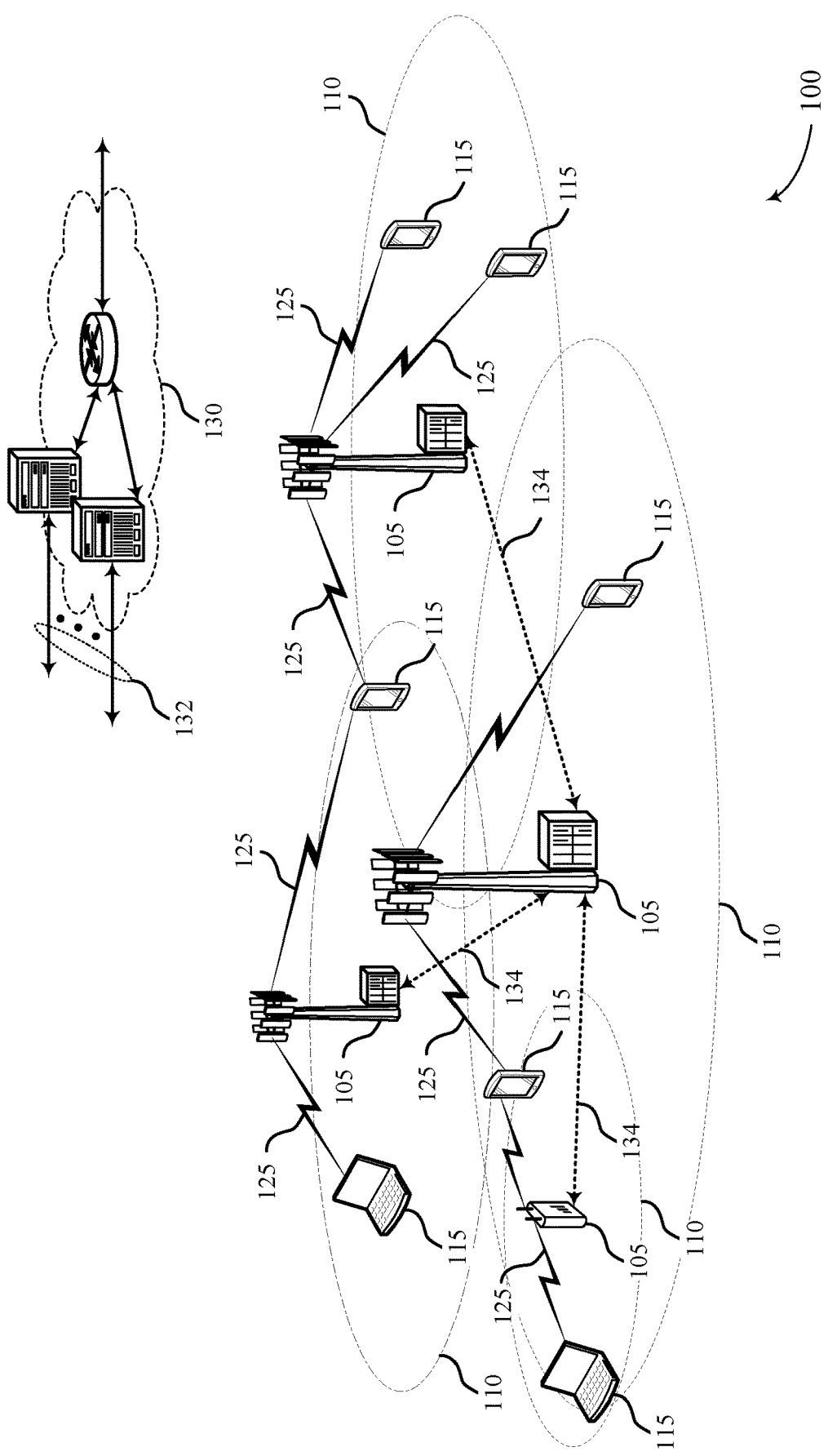
FIG. 1 shows an exemplary system for wireless communication in accordance with the present disclosure.

Developments in wireless communication have led to the arrival of different types of user equipment devices adapted for different purposes. Machine type communication (MTC) is one example of a special-purpose user equipment. MTC devices may connect to a network periodically in order to send or receive small amounts of data. In some cases, the MTC device may operate in very low signal-to-noise ratio (SNR) environments and may be configured to sleep for extended periods. In a typical example, an MTC device may sleep, wake up, communicate briefly, and return to a sleep state. For such devices, battery life may be a key performance measure and product differentiator.

Category-M (Cat-M) devices were introduced by the Third Generation Partnership Project (3GPP) in connection with the development of enhanced MTC (eMTC) technical standards. Cat-M devices may support coverage enhancement operating modes which combine a number of techniques for extending coverage. Among a number of other requirements, Cat-M devices may need to detect downlink signals in operating SNR environments of approximately −18 dB. In these low SNR conditions, a Cat-M device may need to accumulate a number of synchronization signals in order to determine the cell identity of a serving base station and obtain the frame, subframe, and symbol timing used for communication. In some cases, hundreds of milliseconds may be required to complete a synchronization procedure. This extended operation may reduce battery life and thus directly affect the performance of Cat-M devices.

The disclosed techniques may enable power savings in connection with synchronization procedures and may be especially advantageous when used with Cat-M or similar user equipment devices. In one aspect, the disclosed techniques enable early termination of synchronization signal detection through the use of a detection threshold which may be independent of the number of synchronization signals received. Depending upon operating conditions, early termination may result in significant power savings when compared to detection that relies upon receiving a predetermined number of synchronization signals. In another aspect, early termination may be combined with discontinuous reception (DRX) in order to schedule an additional sleep period, thereby realizing further power savings.

Aspects of the disclosure are initially described in the context of a wireless communications system and relate to detecting synchronization signals as part of a cell search or timing synchronization procedure. Aspects of the disclosure are further illustrated by and described with reference to apparatus diagrams, system diagrams, and flowcharts that relate to the foregoing. While aspects and embodiments are described in this application using various illustrations and examples, those skilled in the art will understand that additional implementations and use cases may come about in many different arrangements and scenarios. The descriptions herein may be implemented across different platforms, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.).

Implementations may range a spectrum from chip-level or modular components to non-modular, non-chip-level implementations and further to aggregate, distributed, or original equipment manufacturer (OEM) devices or systems incorporating one or more aspects of the present disclosure. In some practical settings, devices incorporating described aspects and features may also include additional components and features for implementation and practice of claimed and described embodiments. For example, transmission and reception of wireless signals may include a number of components for analog and digital purposes (e.g., hardware components including antenna, radio frequency chains, power amplifiers, modulators, buffer, filters, processor(s), interleavers, adders/summers, etc.). It is intended that aspects of the present disclosure herein may be practiced in a wide variety of devices, chip-level components, systems, distributed arrangements, end-user devices, etc. of varying sizes, shapes, and constitution.

FIG. 1 illustrates an example of a system 100 in accordance with various aspects of the present disclosure. System 100 includes base stations 105, UEs 115, and a core network 130. In some examples, system 100 may be a Long Term Evolution (LTE) network, an LTE-Advanced (LTE-A) network, or a New Radio (NR) network. In some cases, system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. As described herein, a base station 105 may include or may be referred to as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. System 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communication with various UEs 115 is supported. Each base station 105 may provide communication coverage for a respective geographic coverage area 110 via communication links 125, and communication links 125 between a base station 105 and a UE 115 may include one or more carriers. Communication links 125 shown in system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of a corresponding geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. System 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, the cells may support different service and/or device types (e.g., machine-type communication (MTC), narrowband Internet-of-Things (NB-IoT), enhanced mobile broadband (eMBB), ultra-reliable low-latency (URLLC) communications, and others). In some cases, the term "cell" may refer to a portion of a geographic coverage area 110 (e.g., a sector) over which the logical entity operates.

UEs 115 may be dispersed throughout system 100, and each UE 115 may be stationary or mobile. A UE 115 may also be referred to as a wireless device, a mobile device, a mobile station, a remote device, a handheld device, or a subscriber device, or some other suitable terminology, where the "device" may also be referred to as a unit, a station, a terminal, or a client. A UE 115 may also be an electronic device such as a cellular phone, a personal digital assistant (PDA), a tablet computer, a laptop computer, a medical device, industrial equipment, a sensor, an entertainment device, a wearable device, and/or a personal computer. In some examples, a UE 115 may also refer to a wireless local loop (WLL) station, an Internet of Things (IoT) device, an Internet of Everything (IoE) device, an MTC device, an eMTC device, a Cat-M UE, or the like, which may be implemented in various articles such as appliances, vehicles, meters, or the like.

Some UEs 115 may be configured to employ operating modes that reduce power consumption, such as a half-duplex communication operating mode (e.g., a mode that supports one-way communication via transmission or reception, but not transmission and reception contemporaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and system 100 may be configured to provide ultra-reliable communications for these functions.

Base stations 105 may communicate with the core network 130 and with one another. For example, base stations 105 may interface with the core network 130 through backhaul links 132 (e.g., via an S1 interface or another interface). Base stations 105 may communicate with one another over backhaul links 134 (e.g., via an X2 or other interface) either directly (e.g., directly between base stations 105) or indirectly (e.g., via core network 130). The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to a network operator's IP services. Operator IP services may include access to the Internet, Intranet(s), an IP Multimedia Subsystem (IMS), or a Packet-Switched (PS) Streaming Service.

System 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. System 100 may also operate in an extremely high frequency (EHF) region of the spectrum (e.g., from 30 GHz to 300 GHz), also known as the millimeter band. In some examples, system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than super-high frequency (SHF) or ultra-high frequency (UHF) transmissions. Techniques disclosed herein may be employed across transmissions that use one or more different frequency regions, and designated use of bands across these frequency regions may differ by country or regulating body.

In some examples, base station 105 or UE 115 may be equipped with multiple antennas, which may be used to employ techniques such as transmit diversity, receive diversity, multiple-input multiple-output (MIMO) communications, or beamforming. For example, system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

Base station 105 may transmit a control channel, such as a physical downlink control channel (PDCCH), in order to convey downlink control information (DCI) to UEs 115. The DCI can be UE-specific (dedicated) or cell-specific (common) and placed in different dedicated and common search spaces within the PDCCH. A single PDCCH may carry DCI associated with multiple UEs 115. A particular UE 115, therefore, may need to be able to recognize the particular UE 115's DCI in the PDCCH. To that end, a UE 115 may be assigned one or more UE-specific search spaces in the control channel, and may also utilize common search spaces allocated to the UE 115 as well as other UEs 115 in the system 100. The UE 115 may attempt to decode the DCI by performing a process known as blind decoding, during which multiple decoding attempts are carried out in the search spaces until a DCI message is detected or all of the decoding candidates have been checked.

In some cases, the antennas of a base station 105 or UE 115 may be located within one or more antenna arrays, which may support MIMO operations, transmit beamforming, and/or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, system 100 may be a packet-based network that operates according to a layered protocol stack. A given layer in the protocol stack may accept a service data unit (SDU) from an upper layer, perform layer-specific processing, and deliver a protocol data unit (PDU) to a lower layer. In the user plane, communications at the bearer or Packet Data Convergence Protocol (PDCP) layer may be IP-based. A Radio Link Control (RLC) layer may in some cases perform segmentation and reassembly for communicating over logical channels. A Medium Access Control (MAC) layer may perform priority handling and multiplexing of logical channels into transport channels. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. Hybrid automatic repeat request (HARQ) feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., poor signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in a frequency division duplexing (FDD) mode), or be configured to carry downlink and uplink communications (e.g., in a time division duplexing (TDD) mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to transmission time intervals (TTIs) or slots, and TTIs or slots may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers. A carrier may be associated with a particular bandwidth of the radio frequency spectrum, and in some examples the carrier bandwidth may be referred to as a "system bandwidth" of the carrier or the system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., a set of subcarriers or resource blocks (RBs)) within a carrier (e.g., "in-band" deployment of a narrowband protocol type).

System 100 may support communication with a UE 115 on multiple cells or carriers, which may be referred to as carrier aggregation (CA) or multi-carrier operation. A UE 115 may be configured with multiple downlink component carriers (CCs) and one or more uplink CCs according to a carrier aggregation configuration. Carrier aggregation may be used with both FDD and TDD component carriers. In some cases, system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable. Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
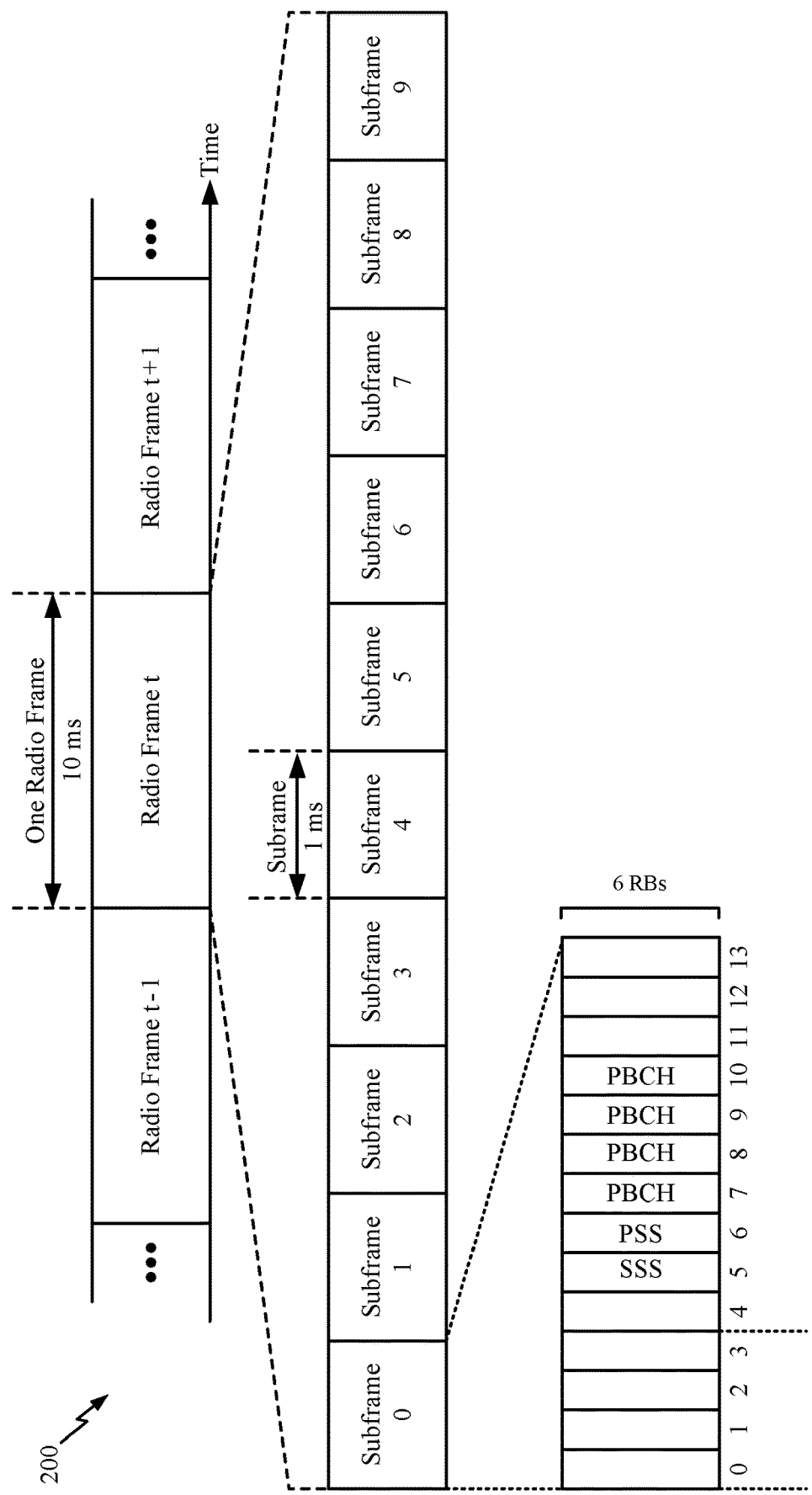
FIG. 2 shows an example of a frame format with synchronization signals according to one aspect of the present disclosure.

FIG. 2 illustrates an exemplary frame structure 200 with synchronization signals according to one aspect of the present disclosure. This example shows a plurality of downlink radio frames such as may be used in LTE systems. It will be readily appreciated, however, that the present disclosure is not limited to a particular radio access technology but can apply to early termination of synchronization procedures in a number of different systems. For instance, the disclosed techniques can be utilized in NR systems with synchronization signal blocks (SSBs) which contain similar synchronization signals.

In the present example, the downlink transmission timeline may be partitioned into units of radio frames. Each radio frame, represented by a system frame number (SFN), may have a predetermined duration (e.g., 10 ms) and may be partitioned into 10 subframes, each of 1 ms duration, with indices of 0 through 9. Each subframe may include a number of symbol periods which may vary according to whether a normal or extended cyclic prefix (CP) is utilized. In some systems, such as NR, the number of OFDM symbols in a slot may also vary based at least in part on subcarrier spacing and multiple numerologies may be supported. A numerology may indicate a symbol length and/or a subcarrier spacing for a given slot or subcarrier.

Synchronization signals may be transmitted in some subframes and not in others. The synchronization signals may include a primary synchronization signal (PSS), a secondary synchronization signal (SSS), and a physical broadcast channel (PBCH). Devices may utilize such synchronization signals for cell identification and time/frequency synchronization. The PSS may provide OFDM symbol, slot, and subframe timing, whereas the SSS may provide the half-frame (i.e., 5 subframes) and radio frame timing. With knowledge of the PSS and SSS, a UE may determine a cell identity of the base station. The PBCH may carry basic system information, such as the downlink system bandwidth, the system frame number (SFN), etc. which may be useful in determining time offsets.

In some aspects, the synchronization signals may occupy a fixed location that is independent of system bandwidth. For example, in LTE systems, the synchronization signals may be transmitted over 6 resource blocks (RBs) centered on the direct current (DC) subcarrier of the system bandwidth. For FDD systems, the synchronization signals may be transmitted in half-frames (HFs) including subframe 0 and subframe 5 of each radio frame, whereas for TDD systems they may be transmitted in HFs including subframe 2 and subframe 6. The PSS may provide a unique cell ID index within a cell ID group of the transmitting base station. The SSS may aid the UE in determining a subframe index and may provide a unique cell ID group number among the possible cell ID groups. In some aspects, cell search is complete when system timing has been determined and a CRC check of PBCH passes.

Figure 3:
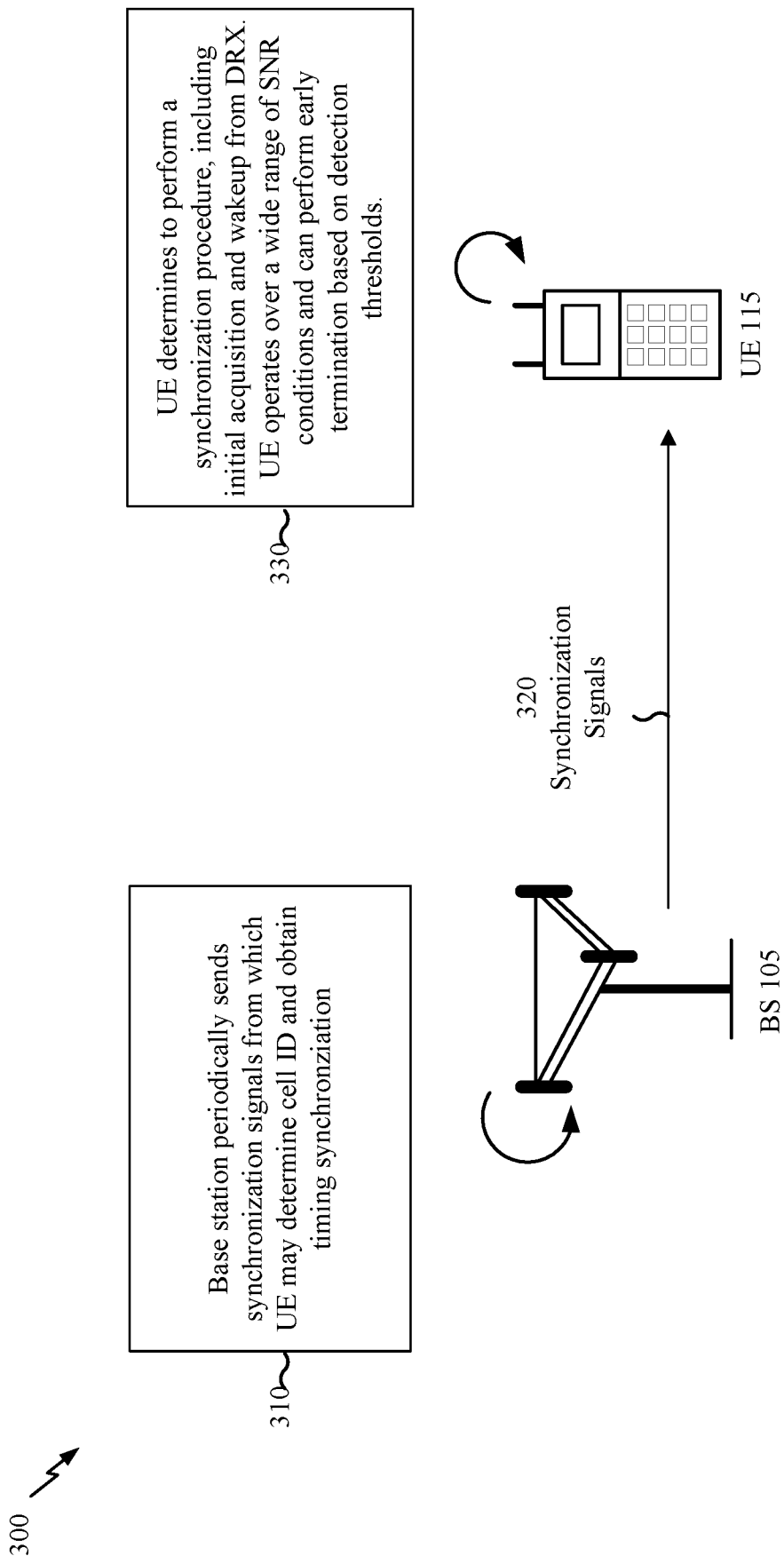
FIG. 3 shows aspects of a synchronization process in accordance with the present disclosure.

FIG. 3 shows an exemplary synchronization process 300 according to the present disclosure. As shown by reference number 310, a base station 105 periodically sends synchronization signals 320, and a UE detects the synchronization signals 320 as a part of a synchronization procedure 330. Base station 105 and UE 115 can be as described in FIG. 1. In one aspect, UE 115 may be a Cat-M UE that supports coverage enhancement and is configured for operation in a wide range of SNR conditions.

In one example, UE 115 may detect synchronization signals 320 from base station 105 as part of an initial acquisition procedure. For instance, when the UE 115 is powered on, the UE 115 may perform a cell search to identify a serving base station. Referring to exemplary frame structure 200, the UE 115 may monitor a central part of the frequency spectrum which may be independent of system bandwidth to find a candidate carrier. At this point, the UE 115 may not know the SNR of the UE 115's operating environment and may need to accumulate energy from multiple synchronization signals in order to facilitate the detection. As a baseline for comparison, in one example, a Cat-M UE may need to accumulate energy from combining 64 half-frames in order to detect synchronization signals 320 from base station 105 with 95% confidence. Since each half-frame represents a 5 ms period in the example of FIG. 2, in the given example, a total of 320 ms may be needed for detection.

The UE 115 may start the UE 115's search for PSS sequences. Base station 105 may generate the PSS from a Zadoff-Chu (ZC) sequence having a Constant Amplitude Zero Auto Correlation (CAZAC) property. Different ZC root indexes may be utilized to signal cell ID index 0, 1 or 2 via the PSS. UE 115 may then attempt to detect the SSS using multiple cell ID group hypotheses in combination with the cell ID index determined from the PSS. In one example, UE 115 may construct pseudo noise (PN) sequences (m-sequences) representing the 168 possible cell group IDs and scrambling sequences that are based at least in part on the cell ID index. By correlating the hypotheses with the received synchronization signals, UE 115 may determine the cell ID group and then the actual cell identifier of base station 105. After the PSS and SSS detection is complete, UE 115 will also be synchronized in time and frequency with base station 105 and be ready to receive downlink broadcast data.

Although different approaches may be used, to ensure a low complexity receiver, the PSS identity and position may be determined first, followed by SSS identity detection. Thus, the number of half frames required to ensure SSS detection may determine overall acquisition time. The number of half frames required to ensure SSS detection, in turn, depends upon SNR conditions which may not be known at initial acquisition or which may have changed significantly during an extended sleep period. For Cat-M devices, this difficulty is compounded by the range of SNR values over which they may operate. For instance, with coverage enhancement Mode A, the UE 115 may need to detect synchronization signals 320 at approximately −6 dB SNR. In one example, SSS detection at this SNR value may involve approximately 8 half frames to complete. Cat-M devices which support Mode B coverage enhancements may need to operate in −18 dB SNR environments which may require up to 256 half frames for SSS detection. As can readily be appreciated, a longer synchronization procedure requires more power to perform than a shorter synchronization procedure and such additional power consumption can adversely affect battery life.

The present disclosure provides for early termination of a synchronization procedure without requiring knowledge of prevailing channel conditions and without having to wait for a predetermined number of synchronization signals to ensure proper detection. As described herein, one or more predetermined detection thresholds may be used to terminate a synchronization procedure. The detection thresholds may be compared with a correlation metric used in PSS/SSS detection.

In one aspect, the detection thresholds are determined based at least in part on an accumulated detection metric so as to maintain the same level of performance when an early termination decision is made as compared with terminating based at least in part on having received a predetermined number of synchronization signals. For instance, correlation metrics for synchronization signals obtained over a range of SNR values may be compared with a target level of performance. A detection threshold representing an accumulated correlation metric value which achieves the target level of performance across all test candidates may then be identified. The detection threshold determined in this manner is independent of the number of synchronization signals received and is determined without reference to a particular SNR condition. The detection threshold may therefore serve as a basis for comparison of accumulated correlation metrics for a received signal.

Consider the previous example of 95% confidence in detecting a synchronization signal in −10 dB SNR conditions when 64 half-frames are received. If the accumulated correlation metric for the 64 half-frames in the −10 dB SNR environment is 99, the same correlation metric might be observed to be approximately 97 in a 0 dB SNR environment in fewer than 64 received half-frames while maintaining the 95% confidence level, and the correlation metric might be observed to be approximately 103 in a −18 dB SNR environment with the same confidence but more than 64 received half-frames. In this example, establishing a detection threshold at 105 will satisfy the target performance level at each observed operating SNR condition albeit with different numbers of received synchronization signals. The hypothetical threshold of 105 is not tied to a particular SNR condition and does not depend on receiving a predetermined number of synchronization signals. Rather, the hypothetical threshold can be used in a comparison to identify early termination opportunities without reducing performance. As described herein, separate detection thresholds for PSS and SSS may be established. In addition, separate detection thresholds may be utilized with different synchronization procedures.

FIG. 4 illustrates aspects of a detection threshold used for early termination 400 in accordance with the present disclosure. In this example, a baseline performance is established for comparison with use of an early termination detection threshold. A number of half-frames needed to achieve a target level of performance in a worst-case SNR environment is shown in comparison column 404. For illustration, it is assumed that 64 half-frames are needed to achieve the target level of performance in the −10 dB environment and this predetermined number of half-frames is used as a baseline for comparison. An exemplary number 406 of half-frames needed to reach the detection threshold for early termination is shown in the adjacent column for each SNR value 402. In some aspects, the exemplary number 406 may be an average number of half-frames. Use of the detection threshold enables the detection process to be terminated more quickly than the predetermined number of half-frames and that this results in the power savings 408 shown in the last column. For instance, in a 0 dB SNR environment, it may be possible to achieve the target level of performance (i.e., reach the detection threshold) in an average of 4 half-frames. Rather than performing detection for the full set of 64 half-frames, detection can be terminated after the detection threshold is reached resulting in a 60/64=93.7% power savings.

Figure 5:
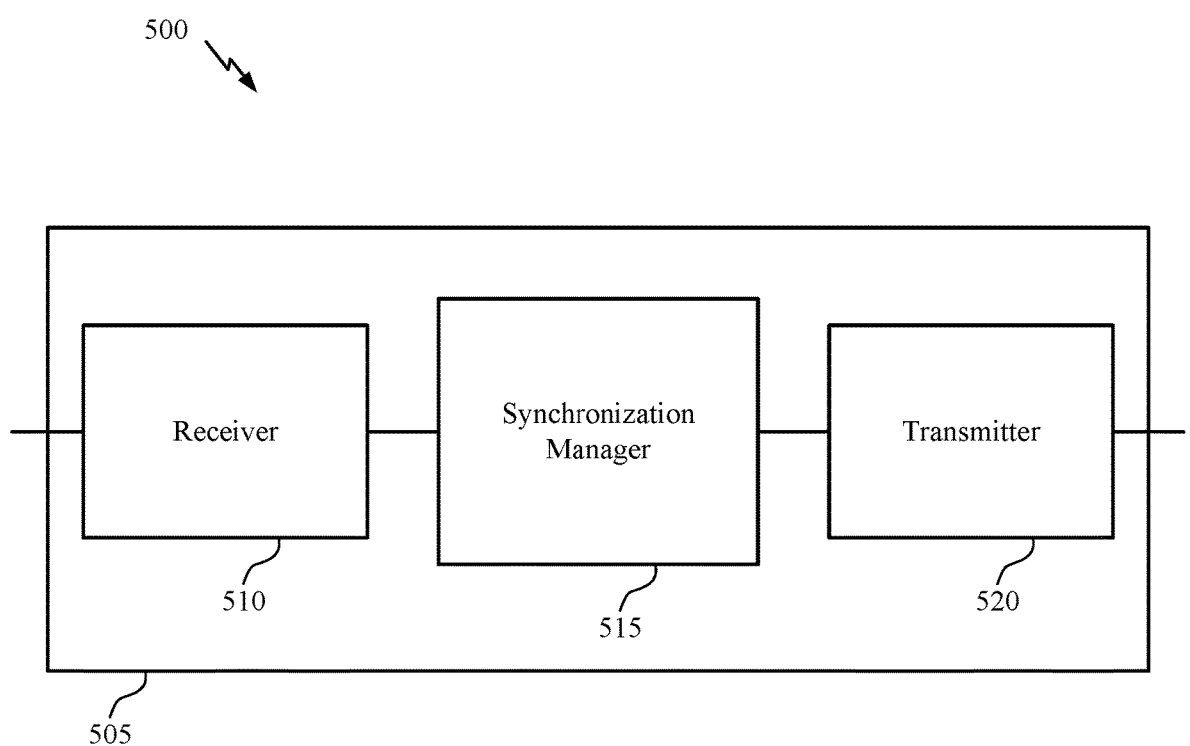
FIG. 5 shows an exemplary user equipment that supports early termination of a synchronization procedure in accordance with the present disclosure.

FIG. 5 shows an example 500 of a user equipment 505 that supports early termination of a synchronization procedure in accordance with the present disclosure. UE 505 may be an example of the user equipment 115 described with reference to FIG. 1 and may implement a detection threshold for early termination as discussed in FIGS. 2-4. In some aspects, UE 505 may be a Cat-M device which may support coverage enhancement and which may, for example, be configured to operate in SNR environments ranging to −18 dB. UE 505 may include a receiver 510, a synchronization manager 515, and a transmitter 520. UE 505 may also include a processor such as processor 820 of FIG. 8. Each of these components may be in communication with one another (e.g., via one or more buses).

Receiver 510 may be configured to receive information such as packets, user data, synchronization signals, or control information associated with various information channels (e.g., control channels, data channels, system information, configuration messages, etc.). For example, under the control of synchronization manager 515, receiver 510 may receive slots or subframes having a PSS, SSS, and PBCH for use in a synchronization procedure such as a cell search or DRX wakeup procedure. Receiver 510 may pass such information on to other components of user equipment 505. For example, receiver 510 may pass information to synchronization manager 515.

Receiver 510 may be an example of aspects of the transceiver 835 described with reference to FIG. 8. Synchronization manager 515 may be an example of aspects of the synchronization manager 715 described with reference to FIG. 7.

Synchronization manager 515 and/or at least some of the various sub-components of synchronization manager 515 may be implemented in hardware, software executed by a processor, firmware, or any combination thereof. If implemented in software executed by a processor, the functions of the synchronization manager 515 and/or at least some of the synchronization manager 515's various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. In some examples, synchronization manager 515 and/or at least some of the sub-components of synchronization manager 515 may be configured as a separate and distinct element in accordance with various aspects of the present disclosure. In other examples, synchronization manager 515 and/or at least some of the various sub-components of synchronization manager 515 may be combined with one or more other hardware components, including but not limited to an I/O component, a transceiver, one or more other components described in the present disclosure, or a combination thereof in accordance with various aspects of the present disclosure.

In some aspects, synchronization manager 515 may determine a synchronization procedure to perform. For instance, when UE 505 is powered on, synchronization manager 515 may determine to perform a cell search as part of an initial system acquisition. As another example, synchronization manager 515 may determine to perform a timing synchronization procedure in connection with DRX operation. Different synchronization procedures may utilize different information available to UE 505. With a DRX-related timing synchronization, for example, the cell identifier and basic time and frequency synchronization may already have been established. In that case, expected identities and locations for PSS and SSS may already be known and may be utilized for detection after UE 505 wakes from sleep. On the other hand, at initial acquisition, UE 505 may have little or no information to leverage in a synchronization procedure.

Synchronization manager 515 may process signals obtained from receiver 510 as part of the determined synchronization procedure. For example, in one aspect, synchronization manager 515 may perform a correlation analysis on the received signals to detect a PSS, SSS, or other synchronization signals. As part of this processing, synchronization manager 515 may generate detection metrics for a current synchronization signal and may accumulate detection metrics for past synchronization signals.

In some aspects, synchronization manager 515 may compare the detection metric and detection metrics accumulated since determining to perform the synchronization procedure with a detection threshold. The detection threshold may be associated with the at least one synchronization signal and may provide a basis for determining whether the UE 505 will continue or terminate the synchronization procedure prior to receiving a predetermined number of synchronization signals. For instance, synchronization manager 515 may utilize a first detection threshold with PSS signals and a second detection threshold with SSS signals. Alternatively, or additionally, synchronization manager 515 may utilize a different set of thresholds depending upon which synchronization procedure is performed. Thus, for example, a PSS threshold and an SSS threshold for use with DRX related timing synchronization may take into account knowledge of a predetermined cell identifier and basic time and frequency synchronization, whereas a PSS detection threshold and an SSS detection threshold used in connection with an initial cell search may not.

Based at least in part on a result of comparing the current and/or accumulated detection metrics with the appropriate detection threshold, in one aspect, synchronization manager 515 may determine to continue or terminate the synchronization procedure. For instance, if the current and/or accumulated detection metrics exceed the detection threshold, the synchronization procedure may be terminated before a predetermined number of synchronization signals have been received. Similarly, the synchronization procedure may continue if the current and/or accumulated detection metrics do not exceed the detection threshold. In one aspect, the detection threshold(s) are independent of the number of synchronization signals received and do not require a knowledge of channel conditions. In some aspects, synchronization manager 515 may adjust a clock of UE 505 once a synchronized condition is reached. For example, the clock may be adjusted based at least in part on detected subframe timing, slot timing, symbol periods, SFN, etc.

Transmitter 520 may be configured to transmit signals generated by other components of UE 505. In one aspect, transmitter 520 may send random access channel (RACH) signals procedure as part of an initial acquisition procedure based at least in part on timing and cell identification information obtained from the synchronization signals. In one aspect, transmitter 520 may respond to pages received when UE 505 wakes from a sleep state associated with DRX operation. Transmitter 520 may be collocated with receiver 510 in a transceiver module. For example, the transmitter 520 may be an example of aspects of the transceiver 835 described with reference to FIG. 8. Transmitter 520 may include a single antenna or a set of antennas.

Figure 6:
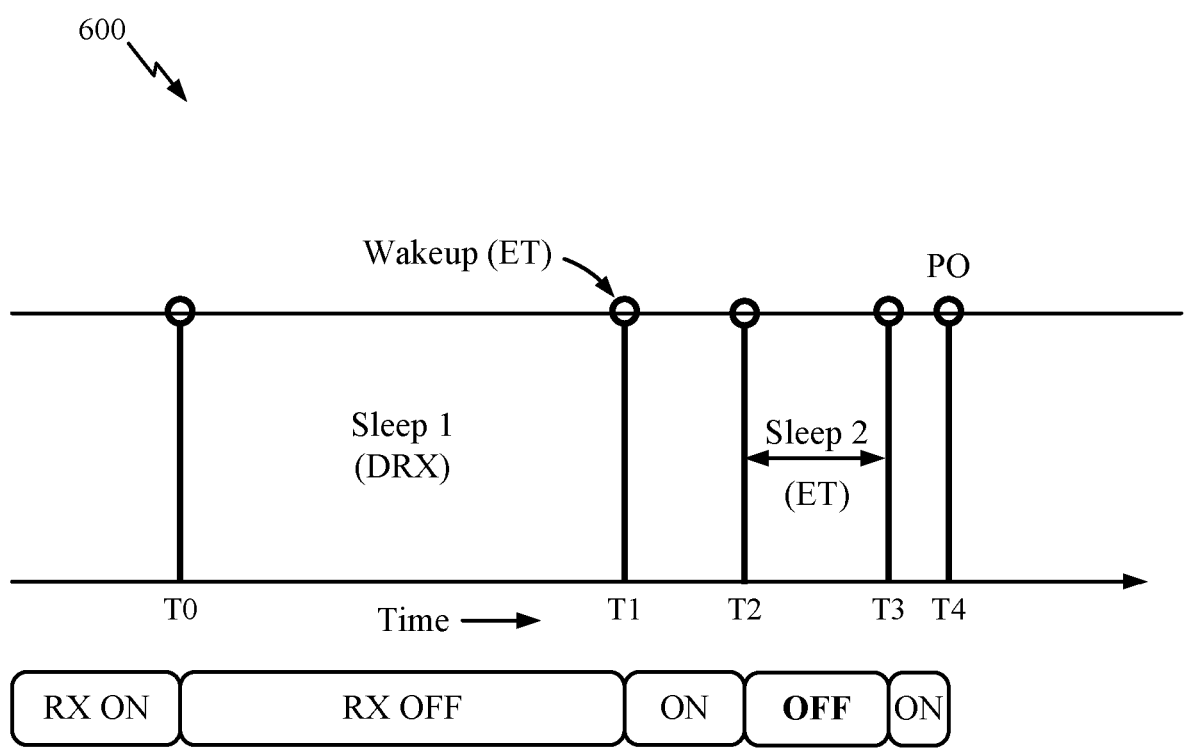
FIG. 6 shows exemplary aspects of a timing synchronization procedure such as may be used with a DRX operating mode.

FIG. 6 shows an example 600 of a timing synchronization procedure such as may be used with a DRX operating mode. This exemplary timing synchronization procedure may be advantageously used with threshold-based early termination (ET) as described in connection with FIGS. 3-4. In some aspects, the exemplary timing synchronization procedure of FIG. 6 may be performed by a user equipment such as the UE 115 described with reference to FIG. 1, or the UE 505 described in connection in FIG. 5.

Discontinuous reception with extended sleep cycles (eDRX) has been introduced in LTE systems. The duration of the DRX off-cycles may, in some examples, be up to 10.24 seconds in connected mode and up to 43.69 minutes in idle mode. The UE may go to sleep during a DRX off-cycle in order to save power and may wakeup at scheduled paging occasions (PO) to check for paging messages from the network.

During DRX sleep periods, a UE may experience clock drift and may lose timing and/or frequency synchronization with the network. For example, if the UE experiences a frequency offset error in sleep state of 1 ppm then, for a carrier frequency fc=2.4 GHz, the frequency drift while the UE is in a sleep state may be around 2.4 KHz on either side of the actual carrier frequency. Similarly, if the UE experiences a timing offset error of 10 ppm in sleep state then, for sleep duration of 10.24*256 s, the timing offset at wakeup may be about 25.6 ms on either side of the expected wakeup time.

To correct for frequency and timing errors, the UE may wake ahead of its next scheduled paging occasion. The amount of time the UE wakes up before the paging occasion may depend upon a length of time needed to complete a timing synchronization procedure. For instance, if 64 half-frames would be required to detect synchronization signals and to correct for timing and frequency errors, then the UE might wake up 320 ms before the next paging occasion to allow for completion of the timing synchronization procedure. According to the present disclosure, a UE may save additional power by utilizing threshold-based early termination to schedule an additional sleep period prior to its paging occasion.

As shown in FIG. 6, prior to time T0, the UE's receiver and related components are powered on and the UE may be sending signals to or receiving signals from a network. At time T0, the UE enters a DRX off-cycle (Sleep 1) and the receiver and related components may be powered off. While in the DRX off-cycle, the UE may experience clock drift and may lose time and/or frequency synchronization. To correct for such errors, the UE may wakeup at time T1 to perform a timing synchronization procedure. Without early termination, the timing synchronization procedure may continue until paging occasion PO is reached. For instance, the UE may wake up so that, accounting for possible clock drift, at least 64 half-frames can be received before PO with the result that the UE's components remain powered on over the entire interval (T4–T1). With early termination, however, the timing synchronization procedure may instead be completed at time T2. As an example, if the timing synchronization procedure can be completed in just 4 half-frames, then a second sleep interval (Sleep 2) may be scheduled in a portion of the 60 half-frames that might otherwise be allocated for detection in a worst-case scenario. In this example, due to early termination, the components can be powered off over the interval of (T3–T2) resulting in added power savings and potentially enhanced battery life.

Figure 7:
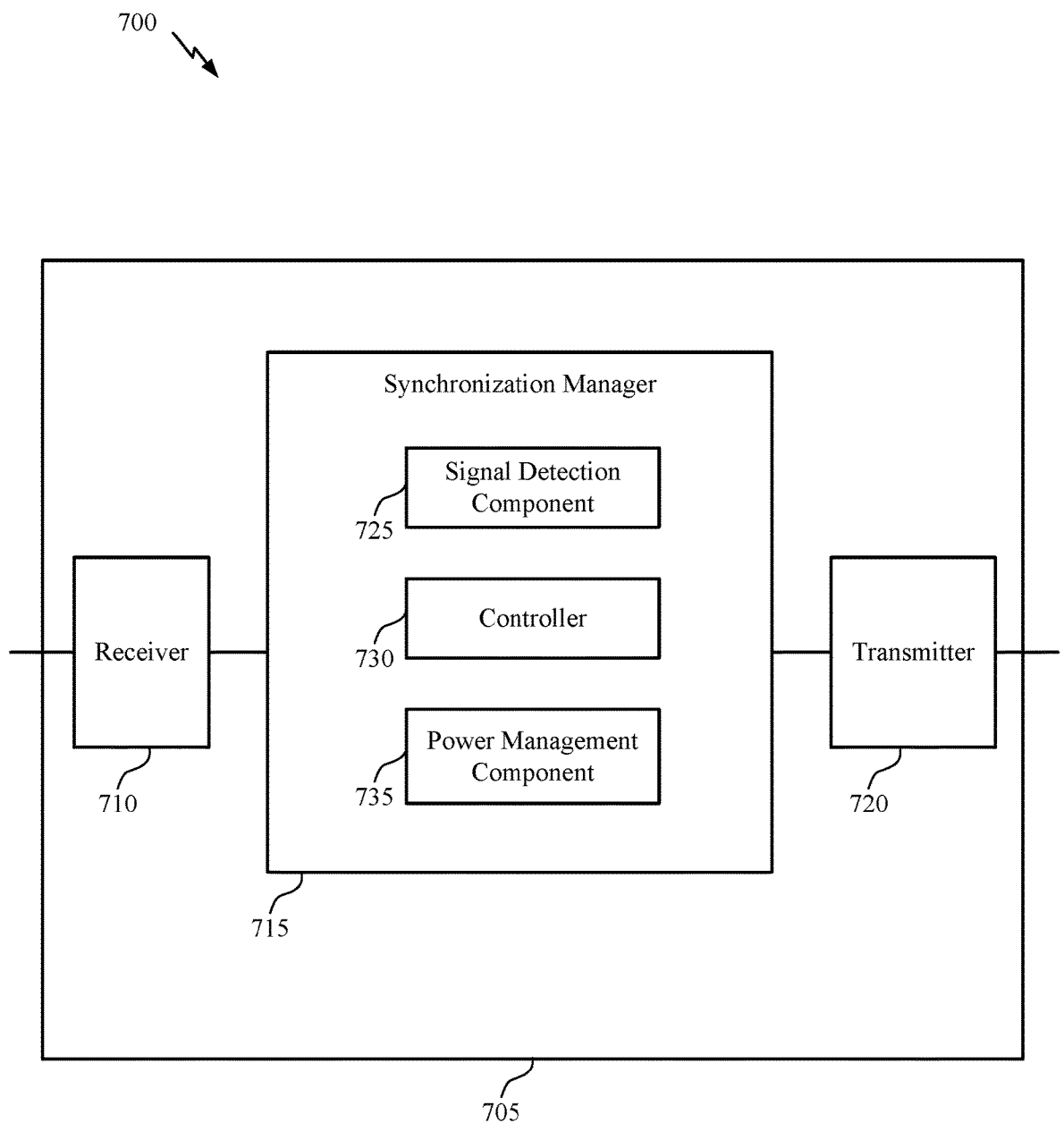
FIG. 7 shows aspects of a user equipment that supports early termination of a synchronization procedure in accordance with the present disclosure.

FIG. 7 shows a block diagram 700 of a user equipment 705 which supports early termination of a synchronization procedure according the present disclosure. UE 705 may be an example of aspects of a user equipment 505 or a user equipment 115 as described with reference to FIGS. 1, 3 and 5. UE 705 may also implement aspects of early termination as discussed in connection with FIGS. 3, 4 and 6. As shown, UE 705 includes a receiver 710, a synchronization manager 715, and a transmitter 720. UE 705 may also include a processor such as processor 820 of FIG. 8. Each of these components may be in communication with one another (e.g., via one or more buses).

Receiver 710 may be configured to receive information such as packets, user data, or control information associated with various information channels (e.g., control channels, data channels, etc.). In one aspect, receiver 710 is configured to receive synchronization signals used in connection with cell search or timing synchronization. Receiver 710 may also be configured to monitor for paging messages from a base station at predetermined paging occasions, system information messages, messages exchanged as part of a RACH procedure, etc. and to pass such information on to other components of UE 705. Receiver 710 may be an example of aspects of the transceiver 835 described with reference to FIG. 8.

Synchronization manager 715 may be an example of aspects of the synchronization manager 515 described with reference to FIG. 5 and may implement some or all of the aspects of early termination described in connection with FIGS. 2, 3, 4 and 6. As shown, synchronization manager 715 may include a signal detection component 725, a controller 730, and a power management component 735.

In some aspects, signal detection component 725 may be configured to process synchronization information in signals obtained from receiver 710. Signal detection component 725 may process synchronization information from downlink signals having a predetermined frame structure, such as the exemplary frame structure 200 used with LTE systems, synchronization signal blocks used with NR systems, or frame structures used with other radio access technologies.

Signal detection component 725 may generate one or more detection metrics for received signals. A detection metric may be based at least in part on a correlation of the received signal with candidates for PSS, SSS, and the like. For example, signal detection component 725 may generate a PSS detection metric and an SSS detection metric for synchronization information in each half-frame, as shown in FIG. 2. Signal detection component 725 may accumulate the detection metrics and provide a current detection metric and/or an accumulated detection metric to controller 730. In some aspects, signal detection component 725 provides only current detection metrics for the received signal being processed and controller 730 accumulates the detection metrics.

Controller 730 may initiate a synchronization procedure at user equipment 705 and may control the operation of signal detection component 725 and power management component 735. For example, when UE 705 is powered up, controller 730 may initiate a cell search as part of initial system acquisition procedure. Also, controller 730 may initiate a timing synchronization procedure in connection with DRX mode operation of UE 705. In general, controller 730 may be configured to perform any procedure in which a cell identification, or a frame, subframe, slot, or symbol timing is acquired from synchronization signals.

In some aspects, controller 730 may perform early termination of synchronization procedures. Early termination may be based at least in part on a detection threshold that is independent of the number of synchronization signals that are processed by signal detection component 725 and does not rely on knowledge of SNR operating conditions. Thus, the early termination can be performed based at least in part on receiving at least one synchronization signal prior to determining an SNR of a wireless channel. In one aspect, controller 730 maintains a separate detection threshold for each synchronization signal for use in each synchronization procedure. For instance, controller 730 may store and retrieve a PSS signal detection threshold and an SSS signal detection threshold for use with an initial cell search and a separate set of thresholds for use with a timing synchronization procedure.

Controller 730 may receive detection metrics from signal detection component 725 and may compare them to one or more predetermined detection thresholds. The detection thresholds may be as described in FIGS. 2-4 and may provide a target level of detection performance. In one aspect, controller 730 may perform early termination of a synchronization procedure when a current or accumulated detection metric exceeds a corresponding detection threshold. For example, by default, controller 730 may identify a predetermined number of synchronization signals to process as part of the synchronization procedure. As detection metrics are generated for each synchronization signal, controller 730 may compare a current or accumulated detection metric to a predetermined detection threshold. If the detection metric exceeds the detection threshold prior to UE 705 receiving the predetermined number of synchronization signals, controller 730 may signal to power management component 735 that detection is complete. Controller 730 may then initiate detection of another synchronization signal or perform timing adjustment when all signals have been detected.

When the synchronization procedure is complete, controller 730 may determine a frequency and/or time offset to be applied at UE 705. The frequency and/or time offset may be applied to a local clock or oscillator to establish an initial cell timing or to correct for drift during a sleep interval. For instance, as discussed in connection with FIGS. 2-3, controller 730 may use information obtained the synchronization signals to establish frame timing, subframe timing, slot timing, symbol timing, etc. for the current cell. Controller 730 may also determine an SFN by decoding information contained in a master information block.

Power management component 735 may be configured to activate or deactivate other components of UE 705 in response to instructions from controller 730. In one aspect, power management component 735 activates operation of signal detection component 725 when controller 730 initiates a synchronization procedure and deactivates the operation of signal detection component 725 based at least in part on early termination being signaled or after a predetermined time when no synchronization signals are detected. With DRX operation, power management component 735 may activate and deactivate receiver 710 and related components to implement an additional, early termination based sleep period as described in connection with FIG. 6.

Transmitter 720 may be configured to transmit signals generated by other components of user equipment 705. In one aspect, transmitter 720 may be configured to send uplink communications to a base station, including uplink data and control information, based at least in part on frequency and timing offsets established by synchronization manager 715. For instance, transmitter 720 may be configured to perform a RACH procedure as part of initial system acquisition, or to respond to paging messages. In some aspects, transmitter 720 may be collocated with receiver 710 in a transceiver module. For example, transmitter 720 may form part of transceiver 835 as described with reference to FIG. 8. Transmitter 720 may include a single antenna, or transmitter 720 may include a set of antennas.

Figure 8:
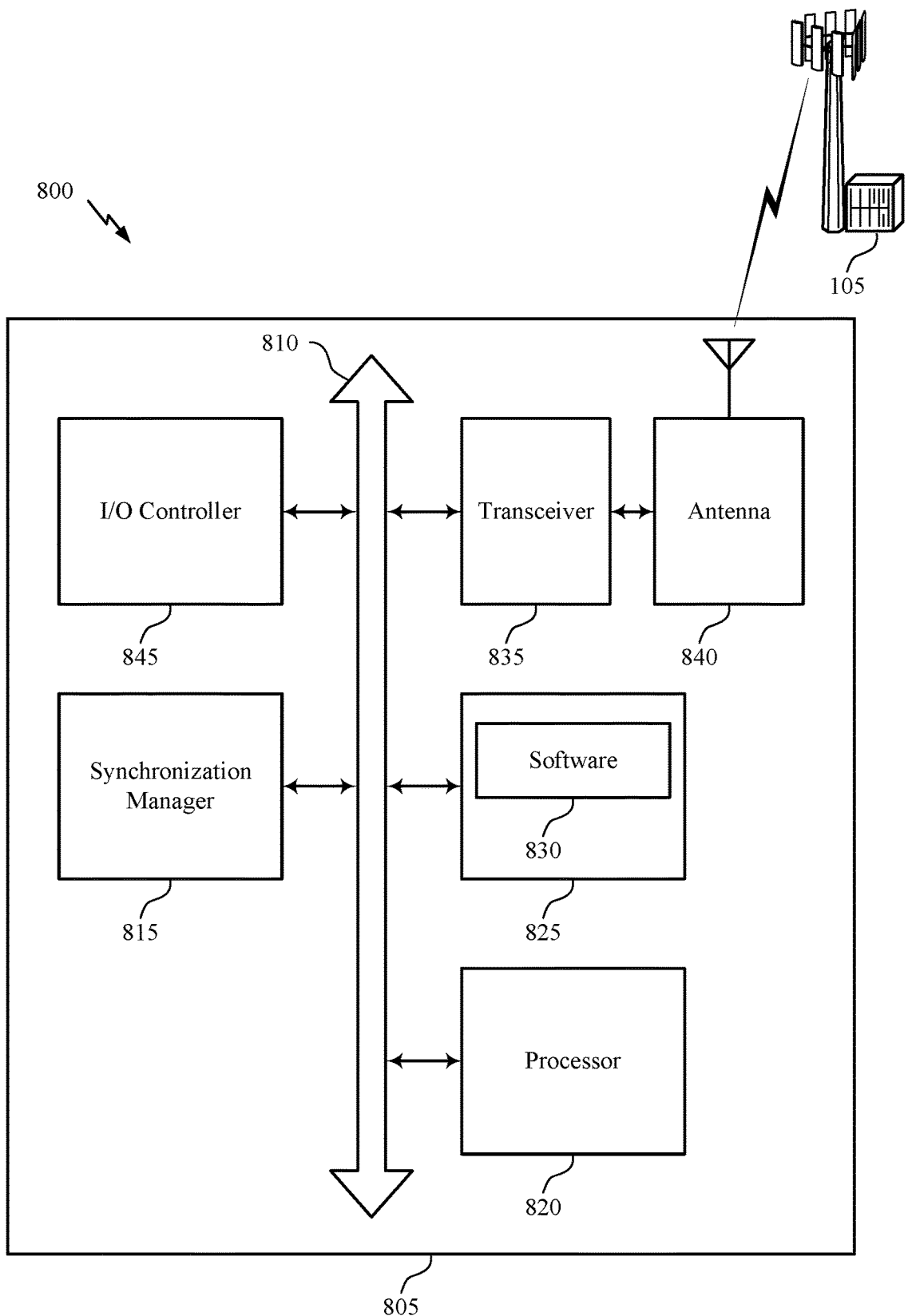
FIG. 8 shows a system including a wireless device that supports early termination of a synchronization procedure in accordance with the present disclosure.

FIG. 8 shows a system 800 including a wireless device 805 that supports early termination of a synchronization procedure in accordance with various aspects of the present disclosure. Wireless device 805 may be an example of, or include the components of, a UE or wireless device as described above, for example, with reference to FIGS. 1, 3, and 5. Wireless device 805 may include components for bi-directional voice and data communications including components for transmitting and receiving communications, including bus 810, communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, an application processor, a SNAPDRAGON®, a DSP, a CPU, a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting low latency transport block assembly).

Memory 825 may include random access memory (RAM) and read-only memory (ROM). The memory 825 may store computer-readable, computer-executable software 830 including instructions that, when executed, cause the processor to perform various functions described herein. In some cases, the memory 825 may contain, among other things, a basic input-output system (BIOS) which may control basic hardware and/or software operation such as the interaction with peripheral components or devices.

Software 830 may include code to implement aspects of the present disclosure, including code to support data channel search space operation. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may form a communications interface of wireless device 805 and may be operative for bi-directional communication, via one or more antennas, wired, or wireless links as described above. For example, the transceiver 835 may represent a wireless transceiver and may communicate bi-directionally with another wireless transceiver. The transceiver 835 may also include a radio frequency front end to process a baseband signal and provide its output to the antennas 840 for transmission, and to similarly process packets received from the antennas.

In some cases, the wireless device 805 may include a single antenna 840. In some cases the wireless device 805 may have more than one antenna 840, which may be capable of concurrently transmitting or receiving multiple wireless transmissions.

I/O controller 845 may manage input and output signals for device 805. I/O controller 845 may also manage peripherals not integrated into wireless device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with wireless device 805 via I/O controller 845 or via other hardware components controlled by I/O controller 845.

Figure 9:
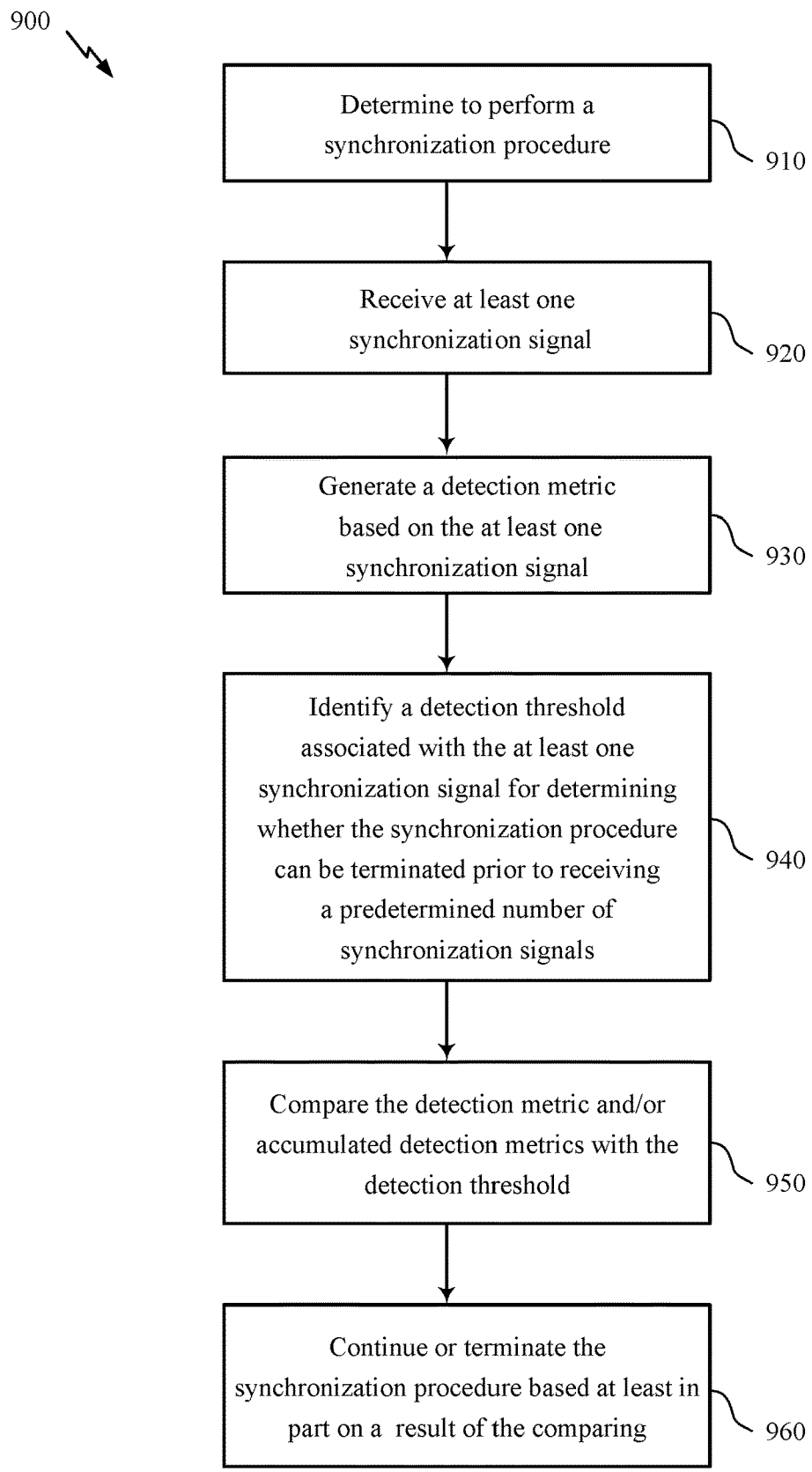
FIG. 9 illustrates a method of wireless communication in accordance with the present disclosure.

FIG. 9 shows a method 900 of wireless communication in accordance with the present disclosure. The operations of method 900 may be performed by a user equipment 115, 505, 705, or a wireless device 805, or components thereof. For example, the operations of method 900 may be performed by a synchronization manager as described with reference to FIGS. 5-8. In some examples, a user equipment 115, 505, 705 or wireless device 805 may execute a set of codes to control the various elements of the device to perform the functions described below. Additionally, or alternatively, the user equipment 115, 505, 705 or wireless device 805 may perform aspects of the functions described below using special-purpose hardware.

At block 910, the user equipment may determine to perform a synchronization procedure. In some aspects, the synchronization procedure may include a cell search conducted as part of initial system acquisition or a timing synchronization procedure utilized with DRX operation. The operations of block 910 may be performed by a user equipment and synchronization manager as described with reference to FIGS. 1, 3, 5, 7 and 8.

At block 920, the UE may receive at least one synchronization signal. In some aspects, the at least one synchronization signal may include a PSS or an SSS which may be received in the exemplary frame structure of FIG. 2. At block 930, the UE may generate a detection metric based at least in part on the received at least one synchronization signal. The detection metric may be a current or accumulated detection metric and may be based at least in part on a correlation between the received synchronization signal and one or more detection candidates. The operations of blocks 920-930 may be performed by a user equipment, including a receiver and a synchronization manager as described with reference to FIGS. 1, 3, 5, 7 and 8.

At block 940, the UE may identify a detection threshold associated with the at least one synchronization signal for determining whether the synchronization procedure can be terminated prior to receiving a predetermined number of synchronization signals. The detection threshold may include a first detection threshold for use with an initial cell search, and a second detection threshold for use with a DRX-based timing synchronization procedure. The first detection threshold may be different than the second detection threshold. In some aspects, the detection threshold may include a first detection threshold for detecting PSS, and a second detection threshold for detecting SSS. In other aspects, detection thresholds may differ for different synchronization signals and for different synchronization procedures. The operations of block 940 may be performed by a user equipment and a synchronization manager as described with reference to FIGS. 1, 3, 5, 7 and 8.

At block 950, the UE may compare the current detection metric and/or the accumulated detection metric with the detection threshold identified in block 940. In some aspects, the UE may also compare a number of received synchronization signals with a predetermined number used as a baseline for the synchronization procedure. If the number of received synchronization signals exceeds the predetermined number and the detection threshold has not be met, this could signal a detection failure. The operations of block 950 may be performed by a user equipment and a synchronization manager as described with reference to FIGS. 1, 3, 5, 7 and 8.

At block 960, the UE may determine to continue or terminate the synchronization procedure based at least in part on a result of the comparison in block 950. In some aspects, when the detection threshold is met, the UE may terminate further detection of synchronization signals from the base station, determine a cell identity and adjustments to time and frequency tracking, and terminate the synchronization procedure. In other aspects, the UE may transition to detecting a next synchronization signal such as detecting SSS using information obtained from PSS. In other aspects, the UE may continue detection of the synchronization signal in a next half-frame or other time period. The operations of block 950 may be performed by a user equipment and a synchronization manager as described with reference to FIGS. 1, 3, 5, 7 and 8.

In some aspects, with DRX operation and a timing synchronization procedure, when the detection threshold is met and early termination of the synchronization procedure can be performed, the UE may determine an amount of time before a next paging occasion and may determine whether an additional, early-termination based sleep period can be scheduled. If the UE determines that sufficient time for the additional sleep period is available, the UE may schedule a sleep period after completing timing synchronization procedure and before the next paging occasion. Additional details of scheduling the additional sleep period are shown in FIG. 6.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based at least in part on" shall not be construed as a reference to a closed set of conditions. For example, an exemplary step that is described as "based at least in part on condition A" may be based at least in part on both a condition A and a condition B without departing from the scope of the present disclosure. In other words, as used herein, the phrase "based at least in part on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication, comprising:
receiving, by a user equipment, at least one synchronization signal associated with a synchronization procedure;
generating a detection metric based at least in part on the at least one synchronization signal;
identifying a detection threshold, associated with the at least one synchronization signal and independent of one or more signal-to-noise operating conditions, for determining whether the synchronization procedure can be terminated prior to receiving a predetermined number of synchronization signals, wherein the detection threshold represents an accumulated correlation metric for synchronization signals achieving a target level of performance;

comparing the detection metric or detection metrics accumulated since determining to perform the synchronization procedure with the detection threshold; and
continuing or terminating the synchronization procedure based at least in part on a result of the comparing and prior to determining a signal-to-noise ratio (SNR) of a wireless channel.

2. The method of claim 1, further comprising terminating the synchronization procedure prior to receiving the predetermined number of synchronization signals.

3. The method of claim 1, wherein determining to perform the synchronization procedure comprises determining to perform an initial cell search or a timing synchronization procedure associated with a wakeup from a discontinuous reception (DRX).

4. The method of claim 3, wherein the detection threshold comprises a first detection threshold for the initial cell search, and a second detection threshold for the timing synchronization procedure.

5. The method of claim 4, wherein the first detection threshold is different than the second detection threshold.

6. The method of claim 3, further comprising determining to perform the timing synchronization procedure, and wherein the timing synchronization procedure is based at least in part on a predetermined cell identifier and an initial cell timing.

7. The method of claim 6, further comprising:
terminating the timing synchronization procedure prior to receiving the predetermined number of synchronization signals;
determining a next paging occasion for the user equipment; and
scheduling a sleep period after completing the timing synchronization procedure and before the next paging occasion.

8. The method of claim 6, further comprising:
scheduling a sleep period prior to a next paging occasion for the user equipment based at least in part on terminating the timing synchronization procedure before the predetermined number of synchronization signals are received.

9. The method of claim 1, wherein the at least one synchronization signal comprises a primary synchronization signal (PSS) and a secondary synchronization signal (SSS), and the detection threshold comprises a PSS threshold and an SSS threshold.

10. The method of claim 1, wherein the detection threshold is independent of a number of synchronization signals received by the user equipment.

11. A user equipment, comprising:
a processor;
memory coupled with the processor; and
instructions stored in the memory and operable, when executed by the processor, to:
receive at least one synchronization signal associated with a synchronization procedure;
generate a detection metric based at least in part on the at least one synchronization signal;
identify a detection threshold, associated with the at least one synchronization signal and independent of one or more signal-to-noise operation conditions, for determining whether the synchronization procedure can be terminated prior to receiving a predetermined number of synchronization signals, wherein the detection threshold represents an accumulated correlation metric for synchronization signals achieving a target level of performance;
compare the detection metric and detection metrics accumulated since determining to perform the synchronization procedure with the detection threshold; and
continue or terminate the synchronization procedure based at least in part on a result of the comparing and prior to determining a signal-to-noise ratio (SNR) of a wireless channel.

12. The user equipment of claim 11, wherein the instructions stored in the memory are operable, when executed by the processor, to terminate the synchronization procedure prior to receiving the predetermined number of synchronization signals.

13. The user equipment of claim 11, wherein the instructions stored in the memory are operable, when executed by the processor, to perform an initial cell search or a timing synchronization procedure associated with a wakeup from a discontinuous reception (DRX).

14. The user equipment of claim 13, wherein the detection threshold comprises a first detection threshold for the initial cell search, and a second detection threshold for the timing synchronization procedure.

15. The user equipment of claim 14, wherein the first detection threshold is different than the second detection threshold.

16. The user equipment of claim 13, wherein the instructions stored in the memory are operable, when executed by the processor, to perform the timing synchronization procedure, and wherein the timing synchronization procedure is based at least in part on a predetermined cell identifier and an initial cell timing.

17. The user equipment of claim 16, wherein the instructions stored in the memory are operable, when executed by the processor to:
terminate the synchronization procedure prior to receiving the predetermined number of synchronization signals;
determine a next paging occasion for the user equipment; and
schedule a sleep period after completing the synchronization procedure and before the next paging occasion.

18. The user equipment of claim 16, wherein the instructions stored in the memory are operable, when executed by the processor to:
schedule a sleep period prior to a next paging occasion for the user equipment based at least in part on terminating the timing synchronization procedure before the predetermined number of synchronization signals are received.

19. The user equipment of claim 11, wherein the at least one synchronization signal comprises a primary synchronization signal (PSS) and a secondary synchronization signal (SSS), and the detection threshold comprises a PSS threshold and an SSS threshold.

20. The user equipment of claim 11, wherein the detection threshold is independent of a number of synchronization signals received by the user equipment.

21. A non-transitory computer readable medium storing code for wireless communication, the code comprising instructions executable by a processor of a user equipment to:
receive at least one synchronization signal associated with a synchronization procedure;
generate a detection metric based at least in part on the at least one synchronization signal;
identify a detection threshold, associated with the at least one synchronization signal and independent of one or more signal-to-noise operating conditions, for determining whether the synchronization procedure can be terminated prior to receiving a predetermined number of synchronization signals, wherein the detection threshold represents an accumulated correlation metric for synchronization signals achieving a target level of performance;

compare the detection metric and detection metrics accumulated since determining to perform the synchronization procedure with the detection threshold; and continue or terminate the synchronization procedure based at least in part on a result of the comparing and prior to determining a signal-to-noise (SNR) of a wireless channel.

22. The non-transitory computer readable medium of claim 21, wherein the instructions are executable to terminate the synchronization procedure prior to receiving the predetermined number of synchronization signals.

23. The non-transitory computer readable medium of claim 21, wherein the instructions are executable to perform an initial cell search or a timing synchronization procedure associated with a wakeup from a discontinuous reception (DRX).

24. The non-transitory computer readable medium of claim 23, wherein the detection threshold comprises a first detection threshold for the initial cell search, and a second detection threshold for the timing synchronization procedure.

25. The non-transitory computer readable medium of claim 24, wherein the first detection threshold is different than the second detection threshold.

26. The non-transitory computer readable medium of claim 23, wherein the instructions are executable to perform the timing synchronization procedure, and wherein the timing synchronization procedure is based at least in part on a predetermined cell identifier and an initial cell timing.

27. An apparatus, comprising:
means for receiving, by a user equipment, at least one synchronization signal associated with a synchronization procedure;

means for generating a detection metric based at least in part on the at least one synchronization signal;

means for identifying a detection threshold, associated with the at least one synchronization signal and independent of one or more signal-to-noise operating conditions, for determining whether the synchronization procedure can be terminated prior to receiving a predetermined number of synchronization signals, wherein the detection threshold represents an accumulated correlation metric for synchronization signals achieving a target level of performance;

means for comparing the detection metric or detection metrics accumulated since determining to perform the synchronization procedure with the detection threshold; and means for continuing or terminating the synchronization procedure based at least in part on a result of the comparing and prior to determining a signal-to-ratio (SNR) of a wireless channel.

28. The apparatus of claim 27, further comprising means for terminating the synchronization procedure prior to receiving the predetermined number of synchronization signals.

29. The apparatus of claim 27, further comprising means for performing an initial cell search or a timing synchronization procedure associated with a wakeup from a discontinuous reception (DRX).

30. The apparatus of claim 29, wherein the detection threshold comprises a first detection threshold for the initial cell search and a second detection threshold for the timing synchronization procedure.

* * * * *